(12) United States Patent
Sheaffer

(10) Patent No.: US 7,028,171 B2
(45) Date of Patent: Apr. 11, 2006

(54) MULTI-WAY SELECT INSTRUCTIONS USING ACCUMULATED CONDITION CODES

(75) Inventor: Gad Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 501 days.

(21) Appl. No.: 10/107,266

(22) Filed: Mar. 28, 2002

(65) Prior Publication Data
US 2003/0191928 A1    Oct. 9, 2003

(51) Int. Cl.
*G06F 9/40* (2006.01)
(52) U.S. Cl. .......................... 712/224; 712/5; 708/236
(58) Field of Classification Search ................ 708/713, 708/236, 207, 232, 233, 709; 712/224, 4–5
See application file for complete search history.

(56) References Cited

U.S. PATENT DOCUMENTS 5,802,336 A * 9/1998 Peleg et al. ................. 712/200

* cited by examiner

Primary Examiner—Richard L. Ellis
(74) Attorney, Agent, or Firm—Kenyon & Kenyon

(57) ABSTRACT

The present invention relates to a method and system for providing an N-way select instruction in a processor. Specifically, a method for providing an N-way select instruction includes decoding an instruction as an N-way select instruction. The method also includes selecting at least one pair of source operands from a plurality of instruction operands using information from a plurality of parallel control registers. The method, further includes selecting a final source operand from each of the selected at least one pair of source operands, and outputting each of the selected final source operands. In general, any N-way select instruction will have $M = \log_2 N$ stages of operation.

41 Claims, 8 Drawing Sheets

MULTI-WAY SELECT INSTRUCTIONS USING ACCUMULATED CONDITION CODES

FIELD OF THE INVENTION

The present invention relates to processor architectures and instruction sets, and in particular, to processor architectures with instruction sets that provide multi-way select instructions using accumulated condition codes.

BACKGROUND

In modern processors, execution of instructions occurs, in general, in the following sequential order: the processor reads an instruction, a decoder the processor decodes the instruction, and, then, the processor executes the instruction. In older processors the clock speed of the processor was generally slow enough that the reading, decoding and executing of each instruction could occur in a single clock cycle. However, modern microprocessors have improved performance by going to shorter clock cycles (that is, higher frequencies). These shorter clock cycles tend to make instructions require multiple, smaller sub-actions that can fit into the cycle time. Executing many such sub-actions in parallel, as in a pipelined and/or super-scalar processor, can improve performance even further. For example, although the cycle time of a present-day processor is determined by a number of factors, the cycle time is, generally, determined by the number of gate inversions that need to be preformed during a single cycle. Ideally, the execute stage determines the cycle time. However, in reality, this is not always the case. With the desire to operate at high frequency, the execute stage can be performed across more than one cycle, since it is an activity that can be pipelined. In a large number of workloads the added latency caused by the additional cycle(s) has only a small impact on processor performance. The ultimate goal of many systems is to be able to complete the execution of as many instructions as quickly and as efficiently as possible without adversely impacting the cycle time of the processor.

One way to increase the number of instructions, or equivalent instructions, that can be executed is to create single instructions that can perform work that currently can only be accomplished by using multiple instructions without causing any timing problems during the execute phase. Instructions of this type can be especially effective in performing multi-way selects.

DETAILED DESCRIPTION

Figure 1:
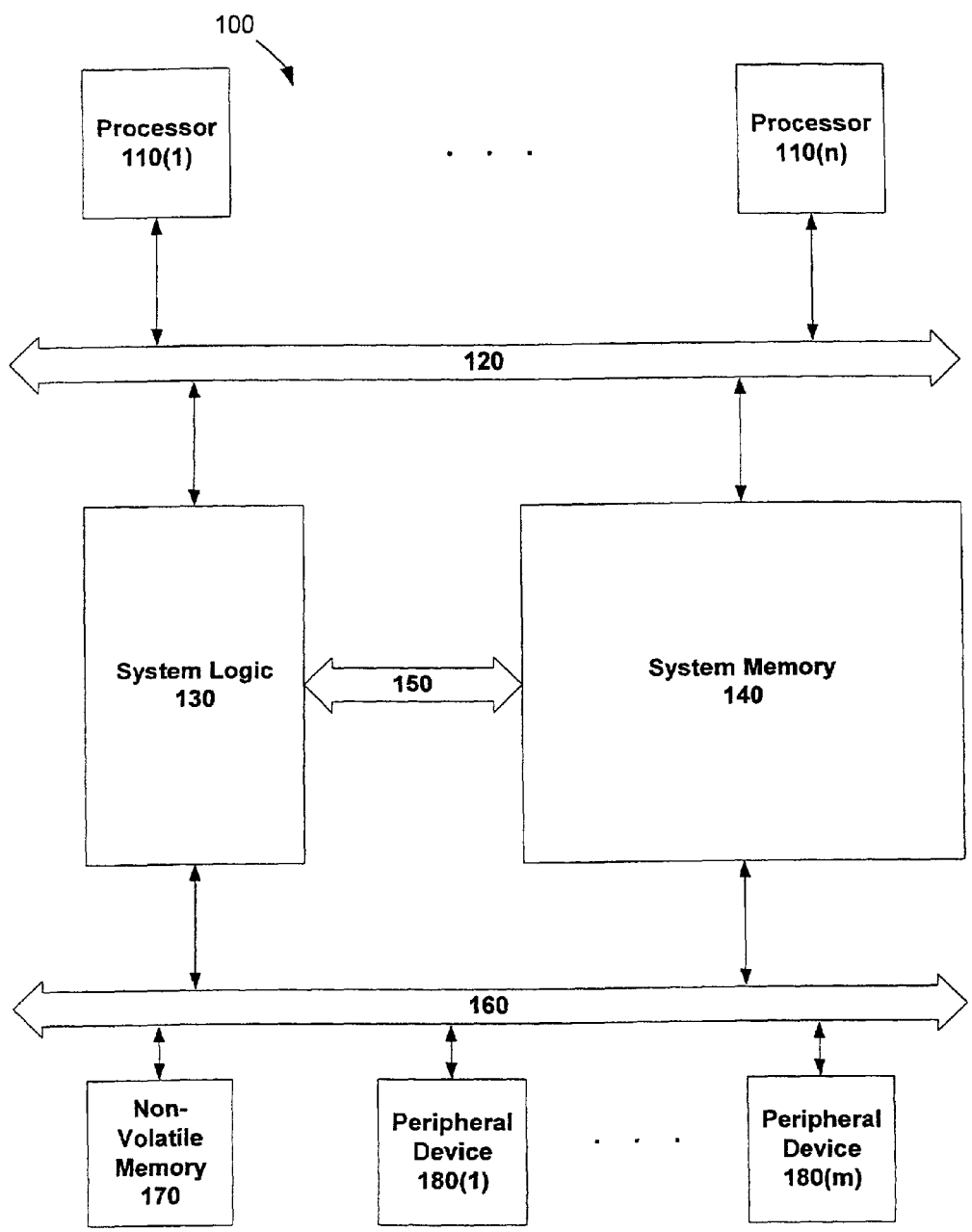
FIG. 1 is a block diagram of a computer system that includes an architectural state including one or more processors, registers and memory, in accordance with an embodiment of the present invention.

In accordance with an embodiment of the present invention, multi-way select instructions, for example, 4-way select, dual 4-way select and quad 4-way select as well as equivalent 8-way select, 16-way select, and/or 32 or more-way select instructions, may be implemented to execute in 2 cycles. Each of the above instructions also may be implemented using, for example, 2:1 multiplexers (MUXs) in each pipe stage. Similarly, 4:1 or 8:1 multiplexers may also be used, however, since the instructions are designed to consume the accumulated results of N-way Compare, MIN and/or MAX instructions, a succession of 2:1 MUX stages may be used. There may be multiple 2:1 multiplexer stages in each clock cycle, or the controls of multiple successive stages may be combined to drive a wider multiplexer, for example, a 4:1 or 8:1 multiplexer. Each 2:1 MUX may use predetermined condition codes to determine which of two source operands to select, where each instruction operand may provide a plurality of source operands that may be input to one or more MUXes. The condition codes may be generated, for example, by N-way, multiple-stage comparison and/or MAX/MIN instructions. The multi-way select instructions may operate in a fully pipelined manner (that is, with a throughput of one (1) instruction every cycle) and produce a result after $\log_2 N$ stages, which may be executed in $\log_2 N$ or fewer clock cycles. The multi-way select instructions may use a number of special purpose registers to control the selection of input source operands. The special purpose registers, definitions of which are specified below, merely illustrate one possible embodiment of the present invention and should not be construed as the only possible embodiment.

In accordance with an embodiment of the present invention, the basic hardware that may be used by the multi-way select instructions may include M-bit multiplexers, which may be fitted easily in a single cycle of any processor. For example, since the blocks are of lower computational complexity, one (1) or more consecutive 2:1 multiplexers may be implemented in each execution stage without impacting the cycle time of the processor.

In addition, implementing the whole operation in a single instruction may provide a significant savings in the pipeline front-end instruction supply requirements, since the functionality of multiple instructions may be packed into a single instruction without causing any timing problems during the execute stage.

The impact of the multi-way select instructions on overall performance can be significant. For example, in accordance with an embodiment of the present invention, a four-way (4-way) select instruction may reduce the latency required for performing the same operation with current instructions by a factor of two (2). It is this reduced latency that may enable a significant speedup of applications using the N-way select instructions. Specifically, the N-way select instructions may enable significant speedup of the execution of a large class of applications, for example, applications for modems, speech and video.

FIG. 1 is a block diagram of a computer system, which includes an architectural state, including one or more processors, registers and memory, in accordance with an embodiment of the present invention. In FIG. 1, a computer system 100 may include one or more processors 110(1)–110(n) coupled to a processor bus 120, which may be coupled to a system logic 130. Each of the one or more processors 110(1)–110(n) may be N-bit processors and may include a decoder (not shown) and one or more N-bit registers (not shown). System logic 130 may be coupled to a system memory 140 through a bus 150 and coupled to a non-volatile memory 170 and one or more peripheral devices 180(1)–180(m) through a peripheral bus 160. Peripheral bus 160 may represent, for example, one or more Peripheral Component Interconnect (PCI) buses, PCI Special Interest Group (SIG) PCI Local Bus Specification, Revision 2.2, published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 170 may be a static memory device such as a read only memory (ROM) or a flash memory. Peripheral devices 180(1)–180(m) may include, for example, a keyboard; a mouse or other pointing devices; mass storage devices such as hard disk drives, compact disc (CD) drives, optical disks, and digital video disc (DVD) drives; displays and the like.

Figure 2A:
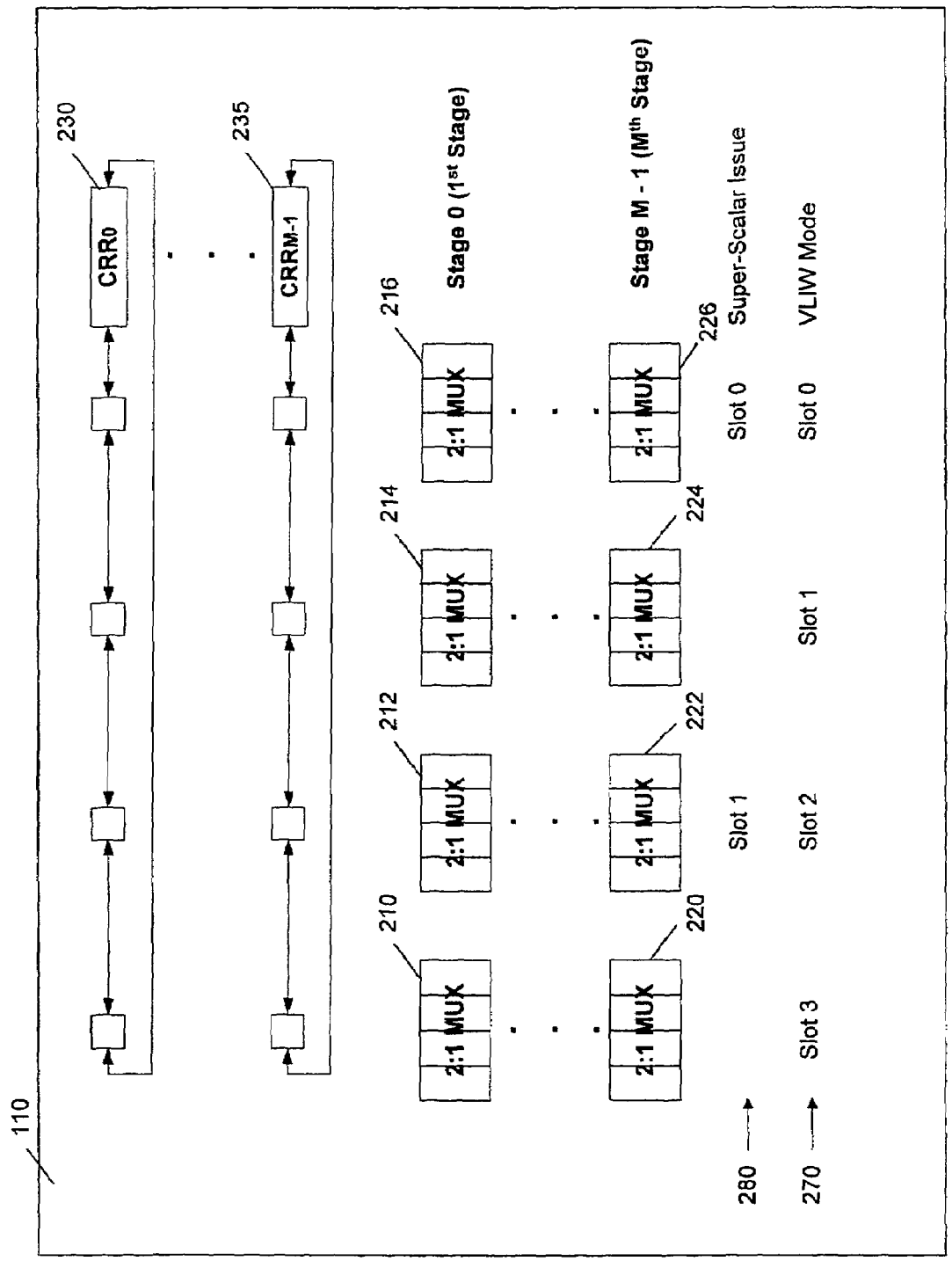
FIG. 2A is an exemplary structure of a processing core of the computer of FIG. 1 having a super-scalar and/or Very Long Instruction Word (VLIW) issue with multiple 2:1 multiplexers (MUXs) implemented in M consecutive execute stages for selecting a final source operand from every N source operands, where $M=\log_2 N$ in accordance with an embodiment of the present invention.

FIG. 2A is an exemplary structure of processor 110 of the computer of FIG. 1 having a super-scalar and/or VLIW issue with multiple 2:1 MUXes 210, 212, 214, 216, 220, 222, 224 and 226 implemented in M consecutive execute stages for performing the N-way selects, in accordance with embodiments of the present invention. It should be clearly understood that the exemplary N-way structure shown in FIG. 2A is merely illustrative of the larger inventive concept and should not be taken to limit the possible structural combinations of the present invention. Likewise, in FIG. 2A, the designation of the blocks 210, 212, 214, 216, 220, 222, 224 and 226 as 2:1 MUXes is merely illustrative of the function of the blocks and should not be taken to limit the possible structural configurations of the blocks.

In FIG. 2A, the processor 110 also may include several common registers including, for example, multiple Compare Result Registers (CRR0 230 though CRRM 235. CRR0 230 through CRRM 235 may be implemented as shift-registers into which all the arithmetic flags generated in a cycle may be shifted. If more than one instruction causing a shift is issued to one of the CRR registers 230, 235 in the same cycle, the CRR registers 230, 235 may be shifted by the sum of the number of instructions causing the shifts.

For example, in FIG. 2A, all of the instructions consuming the contents of any one of CRR0 230 through CRRM 235 may conditionally shift the CRR register used after reading the relevant bits out of the CRR register used. In contrast, all of the instructions modifying the CRR registers may shift the bits of the CRR register used before updating that CRR register. For example, in accordance with an embodiment of the present invention, CRR0 230 may be used for collecting flags generated by the first stage of execution, and for providing flags to the first execution stage. Likewise, CRRM 235 may perform the same function for the final execution stage and for providing flags to the final execution stage. Using CRR0 230 for the first stage flags and CRRM 235 for the second stage flags enables instructions that are writing to and/or reading from CRR0 230 through CRRM 235 to execute back-to-back, that is, in consecutive cycles, without conflict.

Figure 2B:
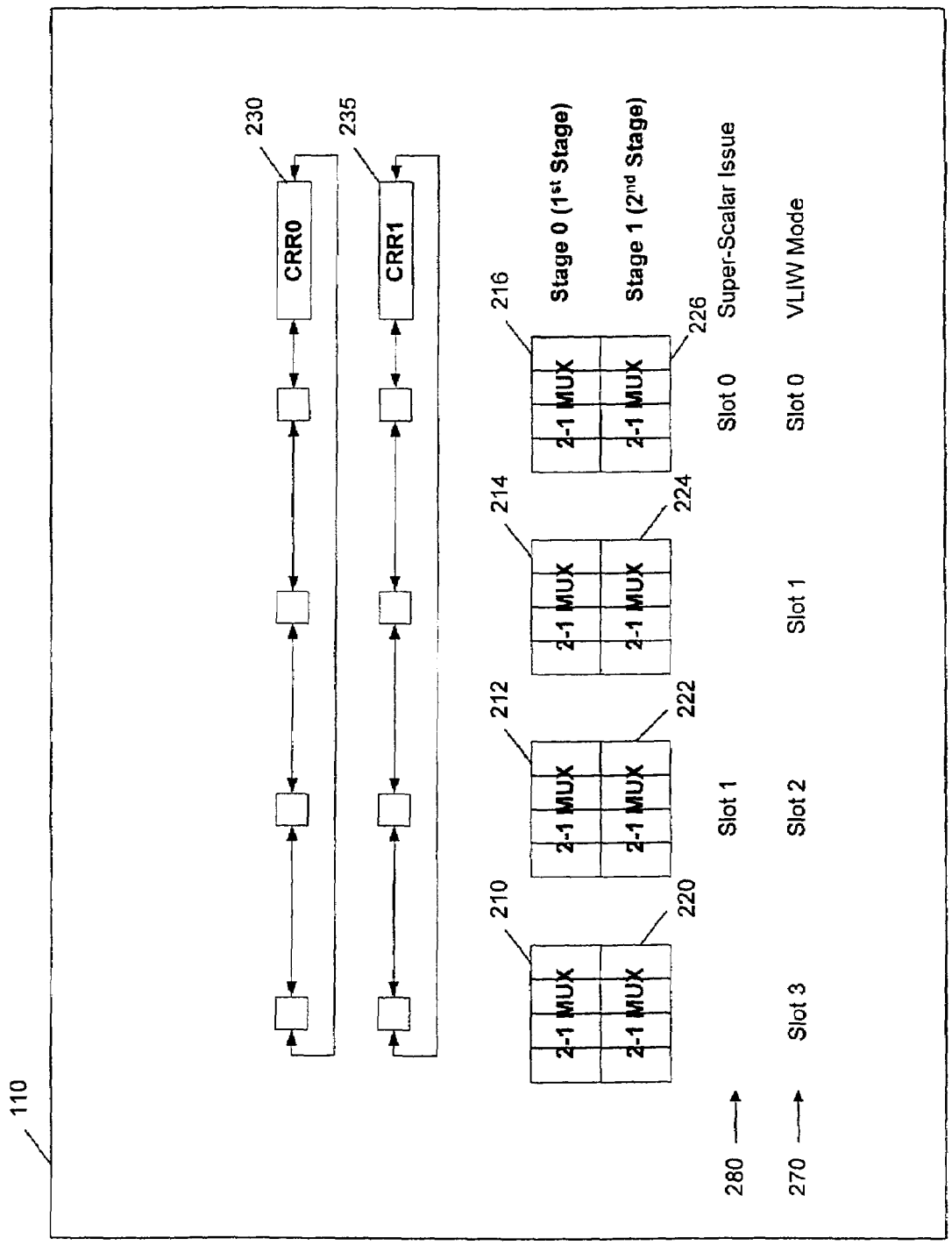
FIG. 2B is an exemplary structure of a processing core of the computer of FIG. 1 having a super-scalar and/or Very Long Instruction Word (VLIW) issue with multiple 2:1 multiplexers (MUXs) implemented in 2 consecutive execute stages for selecting a final source operand from every four source operands, in accordance with an embodiment of the present invention.

FIG. 2B is an exemplary structure of a processor 110 of the computer of FIG. 1 having the same super-scalar and/or VLIW issue with multiple 2:1 MUXes 210, 212, 214, 216, 220, 222, 224 and 226, as in FIG. 2A, and implemented in two (2) consecutive execute stages for performing the 4-way select, dual 4-way select and/or quad 4-way select, in accordance with embodiments of the present invention. Since FIG. 2B provides a specific embodiment of the processor 110 of FIG. 2A, the numbering convention of FIG. 2A is also used in FIG. 2B for identical structures. It should be clearly understood that the exemplary 4-way structure shown in FIG. 2B is merely illustrative of the larger inventive concept and should not be taken to limit the possible structural combinations of the present invention. In fact, as previously discussed, 8-way, 16-way and/or 32 or more-way select instruction embodiments are also contemplated. Likewise, in FIG. 2B the designation of the blocks 212, 216, 220, 222, 224 and 226 as 2:1 MUXes is merely illustrative of the function of the blocks and should not be taken to limit the possible structural configurations of the blocks.

In FIG. 2B, the processor 110 also may include several common registers including, for example, two Compare Result Registers (CRR0, CRR1) 230, 235. CRR0 230 and CRR1 235 may be implemented as shift-registers into which all the arithmetic flags generated in a cycle may be shifted. If more than one instruction causing a shift is issued to one of the CRR registers 230, 235 in the same cycle, the CRR registers 230, 235 may be shifted by the sum of the number of instructions causing the shifts.

For example, in FIG. 2B, all of the instructions consuming the contents of any one of CRR0 230 and CRR1 235 may conditionally shift the CRR register used after reading the relevant bits out of the CRR register used. In contrast, all of the instructions modifying the CRR registers may shift the bits of the CRR register used before updating that CRR register. For example, in accordance with an embodiment of the present invention, CRR0 230 may be used for collecting flags generated by the first stage of execution, and for providing flags to the first execution stage. Likewise, CRR1 235 may perform the same function for the second execution stage and for providing flags to the second execution stage. Using CRR0 230 for the first stage flags and CRR1 235 for the second stage flags enables instructions that are writing to and/or reading from CRR0 230 and/or 235 to execute back-to-back, that is, in consecutive cycles, without conflict.

The multi-way select instructions may use the CRR bits based on the issue slot in which the instruction is executed. For example, for an instruction number, I, I may be $\in\{0,1\}$ in Super-scalar mode, and I may be $\in\{0,1,2,3\}$ in VLIW mode, where only the adder issue slots 270 and 280 are considered.

In order to minimize the amount of connectivity required to steer bits into and out of the CRR registers 230, 235, in FIG. 2B, the instructions using CRR0 230 and CRR1 235, in general, may be packed into the lower issue slots. This means that if N such instructions are issued, they would occupy issue slots 0 to N−1. This restriction, generally, can be easily enforced in VLIW mode, for example, in the four (4) issue slots 270 in FIG. 2. Unfortunately, in super-scalar mode it can be harder to enforce, and occasionally may cause the processor 110 to stall. However, in FIG. 2, in super-scalar mode, if there are only two (2) issue slots 280, it may be easier to provide the required connectivity to enable issuing a single instruction using these registers into slot 1 rather than slot 0.

The multi-way select instructions may be described in the context of the processor 110 having a Super-Scalar issue and/or a VLIW issue. For example, in accordance with an embodiment of the present invention, the data type may be assumed to be 16-bits and the processing core may be assumed to have a 32-bit data path and 32-bit registers. However, it should be clearly understood that this example is merely illustrative and in no way intended to limit the scope of the present invention, since the data type and processing core may be of any other precision either below or the above 16-bit data type:32-bit processing core ratio, for example, 8-bit:32-bit, 16-bit:64-bit or 32-bit:128-bit.

Figure 3:
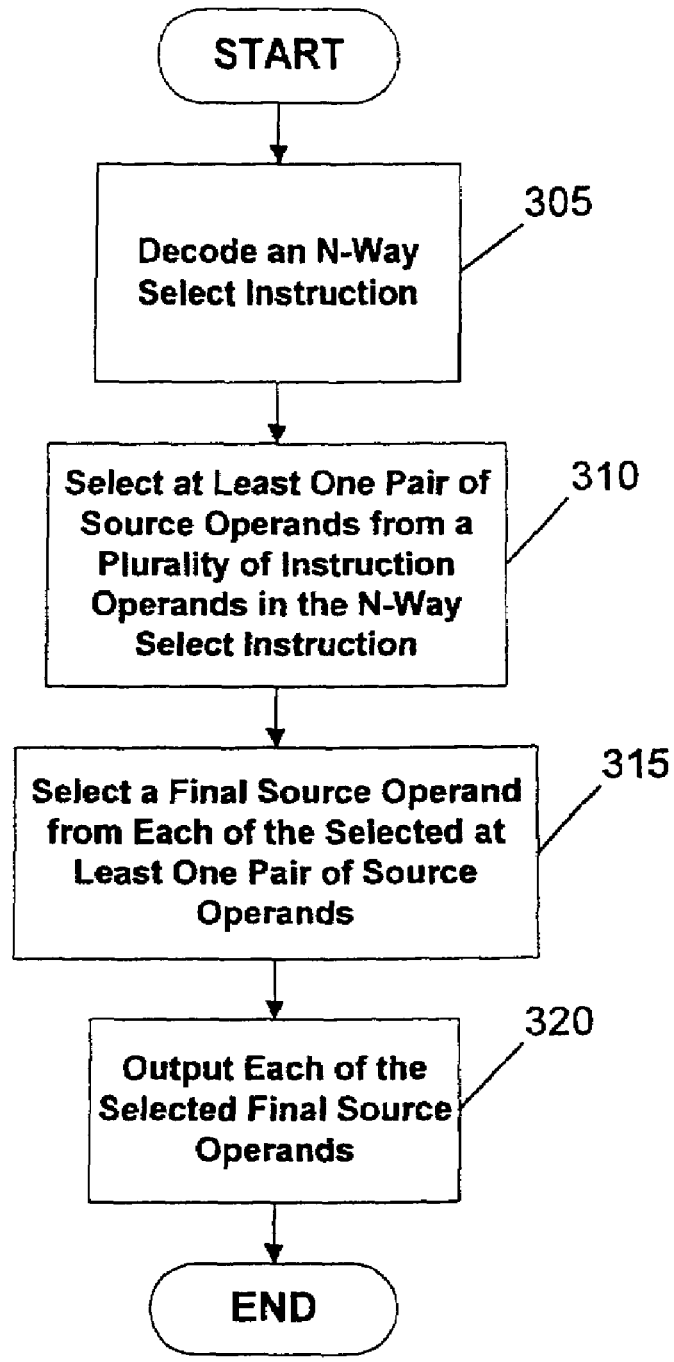
FIG. 3 is a top-level flow diagram of a method for providing an N-way select instruction in a processor, in accordance with an embodiment of the present invention.

FIG. 3 is a top-level flow diagram of a method for providing an N-way select instruction in a processor, in accordance with an embodiment of the present invention. In FIG. 3, an instruction may be decoded 305 in a decoder in processor 110 in FIG. 1 as an N-way select instruction and at least one pair of source operands may be selected 310 from a plurality of instruction operands in the N-way select instruction. A final source operand may be selected 315 from each of the selected at least one pair of source operands. Each of the selected final source operands may be output 320. Although not shown in FIG. 3, the CRR registers may be updated, if a CRR option is set in the N-way select instruction.

In accordance with an embodiment of the present invention, a 4-way select instruction may be implemented to select a single predetermined source operand from two (2) instruction operands, which may each contain two (2) source operands. For example, each of the instruction operands in the 4-way select instruction may contain a low-bit source operand and a high-bit source operand. Generally, for a 32-bit instruction operand, the low-bit source operand may be located in bits 0 through 15 and the high-bit operand would be located in bits 16 through 31. For example, the 4-way select instruction may select a first predetermined source operand from a low-bit source operand (bits 0 through 15) and a high-bit source operand (bits 16 through 31) of a first instruction operand using a first predetermined bit stored in a first CRR. Similarly, the 4-way select instruction may select a second predetermined source operand from a low-bit source operand (bits 0 through 15) and a high-bit source operand (bits 16 through 31) of a second instruction operand using a second predetermined bit stored in the first CRR. The 4-way select instruction also may optionally update the first CRR, select a final predetermined source operand from the first predetermined source operand and the second predetermined source operand, store the selected final predetermined source operand, and optionally update a second CRR. Specifically, the generic syntax of the 4-way select instruction with two (2) input values may be represented by:

[CRR]destR=SEL4(srcA, srcB)

where the square brackets ([ ]) denote optional instruction parameters that are not required for execution of the instruction.

In accordance with an embodiment of the present invention, the 4-way select instruction described below, generally, may be completely executed over two (2) processor clock cycles. However, it should be clearly understood that the instructions also may be implemented to be executed over a single clock cycle as well as over three (3) or more clock cycles. In the following examples, the syntax used may include variables such as signal' and signal", which are delayed versions of a variable signal by one and two cycles, respectively.

In accordance with an embodiment of the present invention, the functionality of the 4-way select instruction may be defined by the following C-style pseudo-code example:

```
First cycle:
    Select a pair of source operands
        tmp0 = CRR0[2i] ? srcA.l : srcA.h
        tmp1 = CRR0[2i + 1] ? srcB.l : srcB.h
    Update CRR0
        If CRR
        {
        Shift CRR0 right by 2
        }
Second cycle:
    Select a final source operand
        destR.1 = CRR1[i] ? tmp0' : tmp1'
    Update CRR1
        If CRR
        {
        Shift CRR1 right by 1
        }
```

Figure 4:
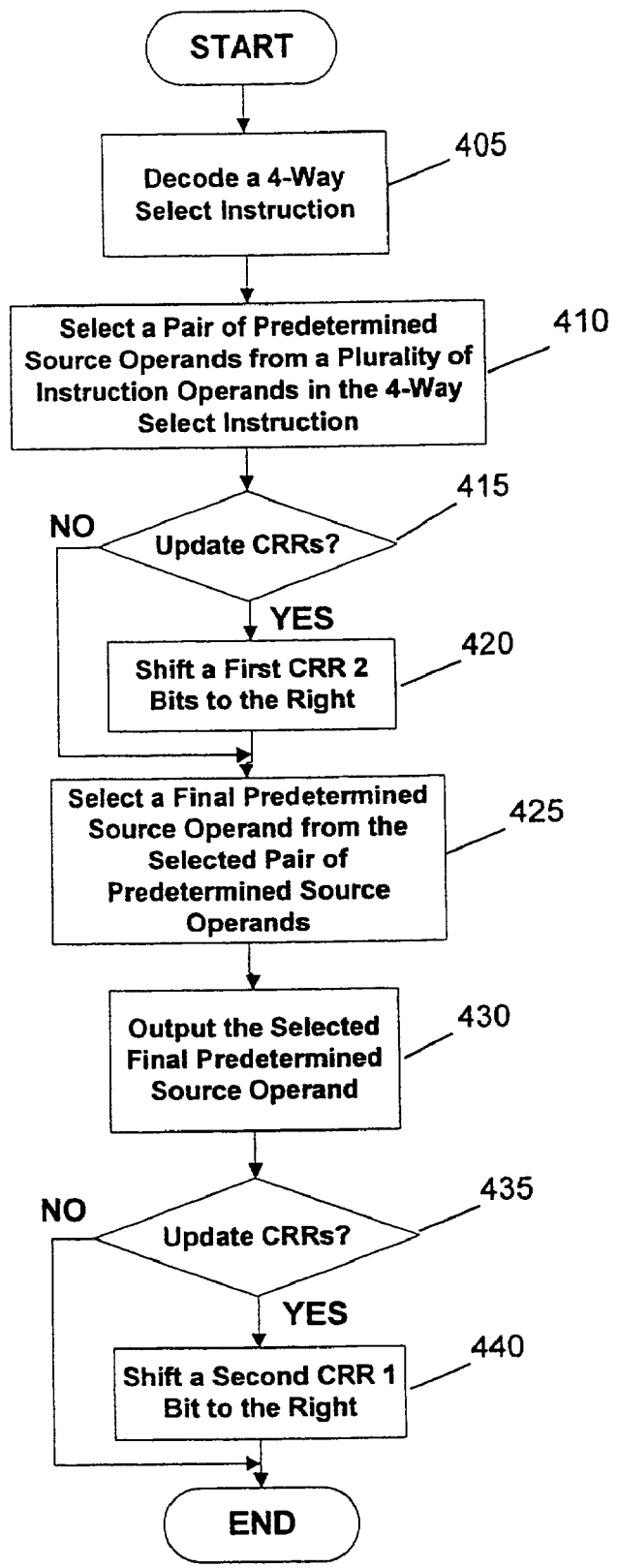
FIG. 4 is a detailed flow diagram of a method for providing a four-way (4-way) select instruction in a processor, in accordance with an embodiment of the present invention.

FIG. 4 is a detailed flow diagram of a method for providing a 4-way select instruction in a processor, in accordance with an embodiment of the present invention. In FIG. 4, an instruction may be decoded 405 as a 4-way select instruction. A pair of predetermined source operands may be selected 410 from a plurality of instruction operands in the 4-way select instruction. Each of the plurality of instructions may have a plurality of source operands. The need to update a CRR register may be determined 415, and if the CRR needs to be updated, the bits of a first CRR, for example, CRR0 230, may be shifted 420 two (2) bits to the right.

In FIG. 4, regardless of whether the first CRR was updated, a final source operand may be selected 425 from the selected pair of predetermined source operands. The selected final predetermined source operand may be output 430 and whether the CRRs are to be updated may be determined 435. If the CRRs are to be updated 435, then a second CRR, for example, CRR1 235, may be shifted 440 one (1) bit to the right. The 4-way select instruction may terminate.

In accordance with an embodiment of the present invention, and similar to the 4-way select instruction, a dual 4-way select instruction may be implemented to select two (2) predetermined final source operands from four (4) instruction operands. In general, each instruction operand in the dual 4-way select instruction may contain two (2) source operands, for example, in a 32-bit instruction operand, a low-bit source operand (bits 0 through 15) and a high-bit source operand (bits 16 through 31). The dual 4-way select instruction may select four (4) predetermined source operands from the instruction operands. For example, the dual 4-way select instruction may select a first predetermined source operand using a first bit stored in a first CRR from one of a low-bit source operand of a first instruction operand and a low-bit source operand of a second instruction operand; select a second predetermined source operand using a second bit stored in the first CRR from one of a high-bit source operand of the first instruction operand and a high-bit source operand of the second instruction operand; select a third predetermined source operand using a third bit stored in the first CRR from one of a low-bit source operand of a third instruction operand and a low-bit source operand of a fourth instruction operand; and select a fourth predetermined source operand using a fourth bit stored in the first CRR from one of a high-bit source operand of the third instruction operand and a high-bit source operand of the fourth instruction operand. The dual 4-way select instruction may optionally update the first CRR. The dual 4-way select instruction also may select two (2) final source operands from the four (4) selected predetermined source operands. For example, the dual 4-way select instruction may select a first final source operand using a first bit stored in a second CRR from one of the first predetermined source operand and the third predetermined source operand; and select a second final source operand using a second bit stored in a second CRR from one of the second predetermined source operand and the fourth predetermined source operand. The dual 4-way select instruction may output the two (2) selected final source operands, and optionally update the second CRR. Specifically, the syntax of the dual 4-way select instruction with four (4) input values may be represented by:

[CRR]destR=DSEL4(srcA, srcB, srcC, srcD)

where square brackets ([ ]) denote optional instruction parameters that are not required for execution of the instruction; and CRR may be a variable that controls the accumulation of condition codes.

In accordance with an embodiment of the present invention, the dual 4-way select instruction described below, generally, may be completely executed over two (2) processor clock cycles. However, it should be clearly understood that the dual 4-way select instruction also may be implemented to be executed over a single clock cycle as well as over three (3) or more clock cycles. In the following examples, the syntax used may include variables such as signal' and signal", which are delayed versions of a variable signal by one and two cycles, respectively.

In accordance with an embodiment of the present invention, the dual 4-way select instruction may be defined by the following C-style pseudo-code example:

First cycle:
    Select pairs of source operands
        tmp0 = CRR0[4i] ? srcA.l : srcB.l
        tmp1 = CRR0[4i + 1] ? srcA.h : srcB.h
        tmp2 = CRR0[4i + 2] ? srcC.l : srcD.l
        tmp3 = CRR0[4i + 3] ? srcC.h : srcD.h
    Update CRR0
        If CRR
        {
        Shift CRR0 right by 4
        }

-continued

Second cycle:
    Select final source operands from pairs of source operands selected in the first cycle
        destR.l = CRR1[2i] ? tmp0', tmp2'
        destR.h = CRR1[2i + 1] ? tmp1',tmp3'
    Update CRR1
        If CRR
        {
        Shift CRR1 right by 2
        }

Figure 5:
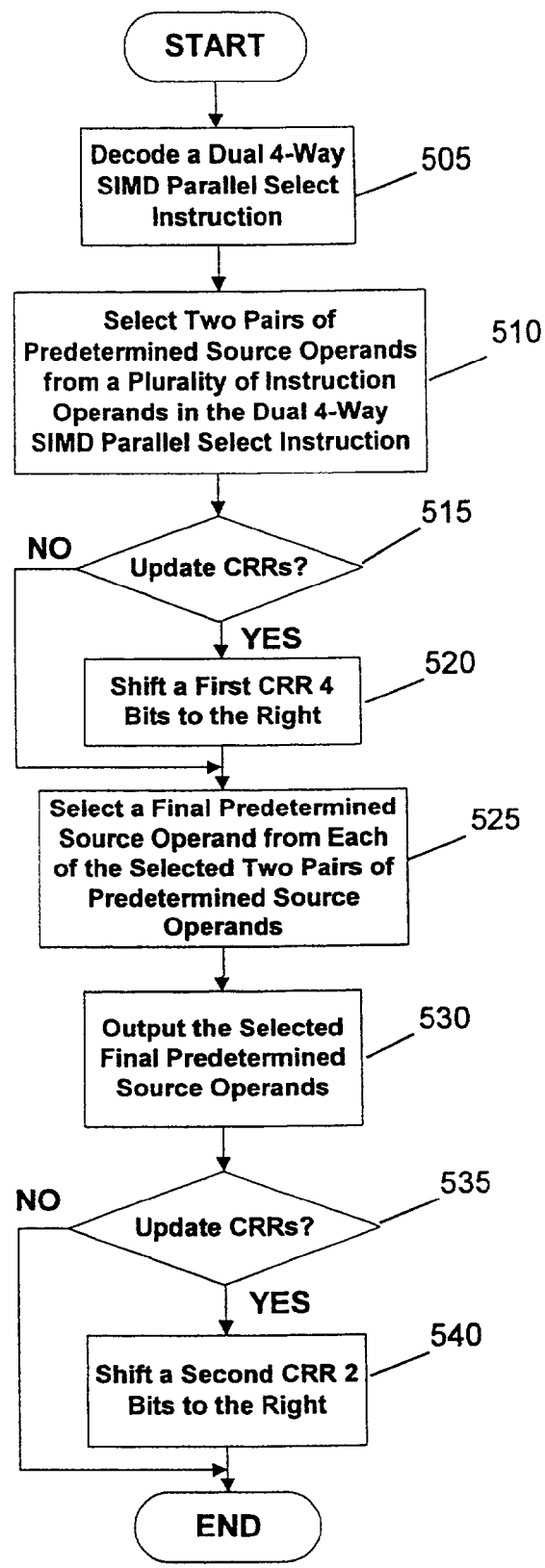
FIG. 5 is a detailed flow diagram of a method for providing a dual four-way (4-way) select instruction in a processor, in accordance with an embodiment of the present invention.

FIG. 5 is a detailed flow diagram of a method for providing a dual 4-way select instruction in a processor, in accordance with an embodiment of the present invention. In FIG. 5, an instruction may be decoded 505 in a decoder in processor 110 of FIG. 1 as a dual 4-way select instruction. In FIG. 5, two pairs of predetermined source operands may be selected 510 from a plurality of instruction operands in the dual 4-way select instruction. Each of the plurality of instructions may have a plurality of source operands. The need to update a CRR register may be determined 515, and if the CRR needs to be updated, the bits of a first CRR, for example, CRR0 230, may be shifted 520 four (4) bits to the right.

In FIG. 5, regardless of whether the first CRR was updated, a final predetermined source operand may be selected 525 from each of the selected two pairs of predetermined source operands. The selected final predetermined source operands may be output 530 and whether the CRRs are to be updated may be determined 535. If the CRRs are to be updated 535, then a second CRR, for example, CRR1 235, may be shifted 540 two (2) bits to the right. The dual 4-way select instruction may terminate.

In accordance with an embodiment of the present invention, and similar to the dual 4-way select instruction, a quad 4-way select instruction may be implemented to select four (4) predetermined final source operands from eight (8) predetermined pairs of source operands from the four (4) instruction operands. Specifically, the syntax of the quad 4-way select instruction with four (4) input values may be represented by:

[CRR]destR=QSEL4(srcA, srcB, srcC, srcD)

where square brackets ([ ]) denote optional instruction parameters that are not required for execution of the instruction; CRR may be a variable that controls the accumulation of condition codes; and each instruction operand (srcA, srcB, srcC, srcD) may have four (4) source operands. For example, where srcA, srcB, srcC and srcD are each 32-bit instruction operands and each instruction operand may contain four (4) 8-bit source operands, a low, low-bit source operand (bits 0 through 7), a high, low-bit source operand (bits 8 through 15), a low, high-bit source operand (bits 16 through 23), and a high, high-bit source operand (bits 24 through 31).

In accordance with an embodiment of the present invention, the quad 4-way select instruction described below, generally, may be completely executed over two (2) processor clock cycles. However, it should be clearly understood that the quad 4-way select instruction also may be implemented to be executed over a single clock cycle as well as over three (3) or more clock cycles. In the following examples, the syntax used may include variables such as signal' and signal", which are delayed versions of a variable signal by one (1) and two (2) cycles, respectively.

In accordance with an embodiment of the present invention, the quad 4-way select instruction may be defined by the following C-style pseudo-code example:

```
First cycle:
    Select pairs of source operands
        tmp0 = CRR0[8i] ? srcA.ll : srcB.ll
        tmp1 = CRR0[8i + 1] ? srcA.lh : srcB.lh
        tmp2 = CRR0[8i + 2] ? srcA.hl : srcB.hl
        tmp3 = CRR0[8i + 3] ? srcA.hh : srcB.hh
        tmp4 = CRR0[8i + 4] ? srcC.ll : srcD.ll
        tmp5 = CRR0[8i + 5] ? srcC.lh : srcD.lh
        tmp6 = CRR0[8i + 6] ? srcC.hl : srcD.hl
        tmp7 = CRR0[8i + 7] ? srcC.hh : srcD.hh
    Update CRR0
        If CRR
        {
        Shift CRR0 right by 8
        }
Second cycle:
    Select final source operands from the pairs of selected source
    operands
        destR.ll = CRR1[4i] ? tmp0', tmp4'
        destR.lh = CRR1[4i + 1] ? tmp1', tmp5'
        destR.hl = CRR1[4i + 2] ? tmp2', tmp6'
        destR.hh = CRR1[4i + 3] ? tmp3', tmp7'
    Update CRR1
        If CRR
        {
        Shift CRR1 right by 4
        }
```

Figure 6:
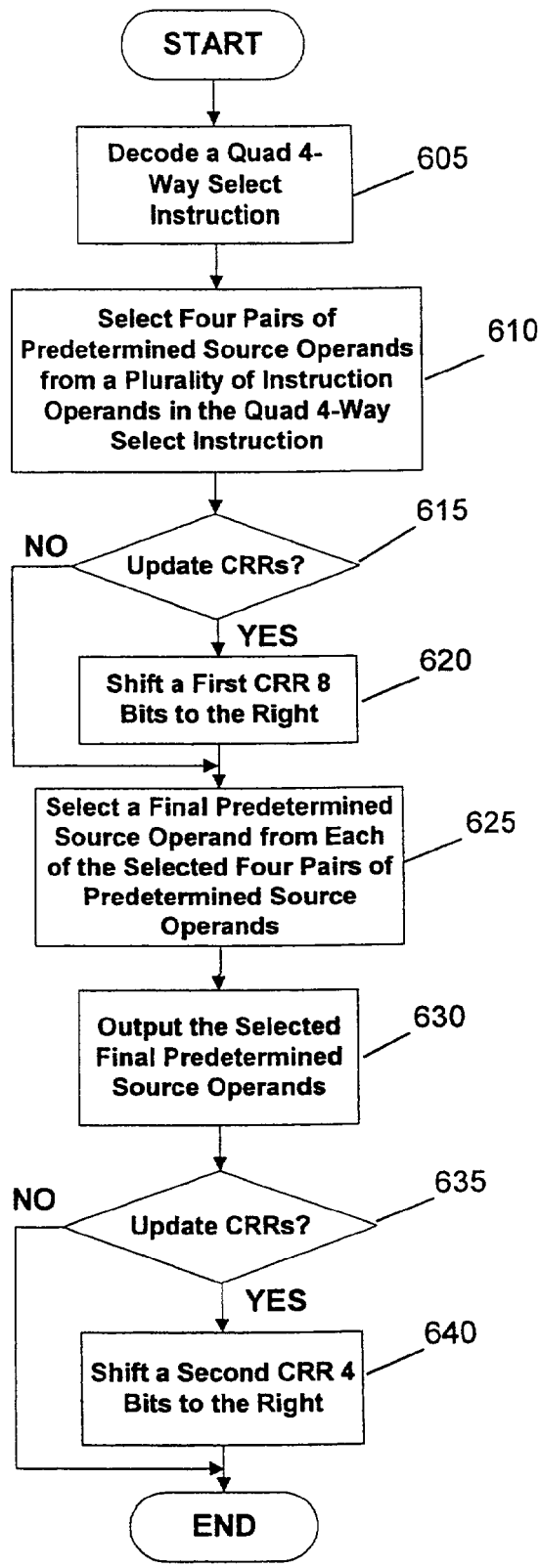
FIG. 6 is a detailed flow diagram of a method for providing a quad four-way (4-way) select instruction in a processor, in accordance with an embodiment of the present invention.

FIG. 6 is a detailed flow diagram of a method for providing a quad 4-way select instruction in a processor, in accordance with an embodiment of the present invention. In FIG. 6, an instruction may be decoded 605 in a decoder in processor 110 of FIG. 1 as a quad 4-way select instruction. Four (4) pairs of predetermined source operands may be selected 610 from a plurality of instruction operands in the quad 4-way select instruction. Each of the plurality of instructions may have a plurality of source operands. The need to update a CRR register may be determined 615, and if the CRR needs to be updated, the bits of a first CRR, for example, CRR0 230, may be shifted 620 eight (8) bits to the right.

In FIG. 6, regardless of whether the first CRR was updated, a final predetermined source operand may be selected 625 from each of the selected four pairs of predetermined source operands. The selected final predetermined source operands may be output 630 and whether the CRRs are to be updated may be determined 635. If the CRRs are to be updated 635, then a second CRR, for example, CRR1 235, may be shifted 640 four (4) bits to the right. The quad select instruction may terminate.

In accordance with an embodiment of the present invention, similar to the 4-way select instruction, an 8-way select instruction may be implemented to select a single predetermined source operand from two (2) instruction operands, which may each contain four (4) source operands. For example, each of the instruction operands in the 8-way select instruction may contain a low, low-bit source operand, a low, high-bit source operand, a high, low-bit source operand and a high, high-bit source operand. For example, the 8-way select instruction may select a first predetermined source operand from a low, low-bit source operand and a low, high-bit source operand of a first instruction operand using a first predetermined bit stored in a first CRR. The 8-way select instruction may also select a second predetermined source operand from a high, low-bit source operand and a high, high-bit source operand. Similarly, the 8-way select instruction may select a third predetermined source operand from a low, low-bit source operand and a low, high-bit source operand of a second instruction operand using a third predetermined bit stored in the first CRR. The 8-way select instruction may also select a fourth predetermined source operand from a high, low-bit source operand and a high, high-bit source operand. The 8-way select instruction also may optionally update the first CRR.

The 8-way select instruction may select a fifth predetermined source operand from the first predetermined source operand and the second predetermined source operand using a first predetermined bit stored in a second CRR. The 8-way select instruction may select a sixth predetermined source operand from the third predetermined source operand and the fourth predetermined source operand using a second predetermined bit stored in the second CRR. The 8-way select instruction also may optionally update the second CRR.

The 8-way select instruction also may select a final predetermined source operand from the fourth predetermined source operand and the fifth predetermined source operand, output the selected final predetermined source operand, and optionally update a third CRR. Specifically, the generic syntax of the 8-way select instruction with two (2) input values may be represented by:

[CRR]destR=SEL8(srcA, srcB)

where the square brackets ([ ]) denote optional instruction parameters that are not required for execution of the instruction; and CRR may be a variable that controls the accumulation of condition codes.

In accordance with an embodiment of the present invention, the 8-way select instruction described below, generally, may be completely executed over two (2) processor clock cycles. However, it should be clearly understood that the instructions also may be implemented to be executed over a single clock cycle as well as over three (3) or more clock cycles. In the following examples, the syntax used may include variables such as signal' and signal", which are delayed versions of a variable signal by one and two cycles, respectively.

In accordance with an embodiment of the present invention, the functionality of the 8-way select instruction may be defined by the following C-style pseudo-code example:

```
First cycle:
    Select two pair of source operands
        tmp0 = CRR0[4i] ? srcA.ll : srcA.lh
        tmp1 = CRR0[4i + 1] ? srcA.hl : srcA.hh
        tmp0 = CRR0[4i + 2] ? srcB.ll : srcB.lh
        tmp1 = CRR0[4i + 3] ? srcB.l : srcB.h
    Update CRR0
        If CRR
        {
        Shift CRR0 right by 4
        }
    Select a pair of source operands from the first selected source
    operands
        tmp0 = CRR0[2i] ? tmp0 : tmp1
        tmp1 = CRR0[2i + 1] ? tmp2 : tmp3
    Update CRR1
        If CRR
        {
        Shift CRR1 right by 2
        }
```

-continued

```
Second cycle:
    Select a final source operand
        destR.l = CRR2[i] ? tmp4' : tmp5'
    Update CRR2
        If CRR
        {
        Shift CRR2 right by 1
        }
```

Figure 7:
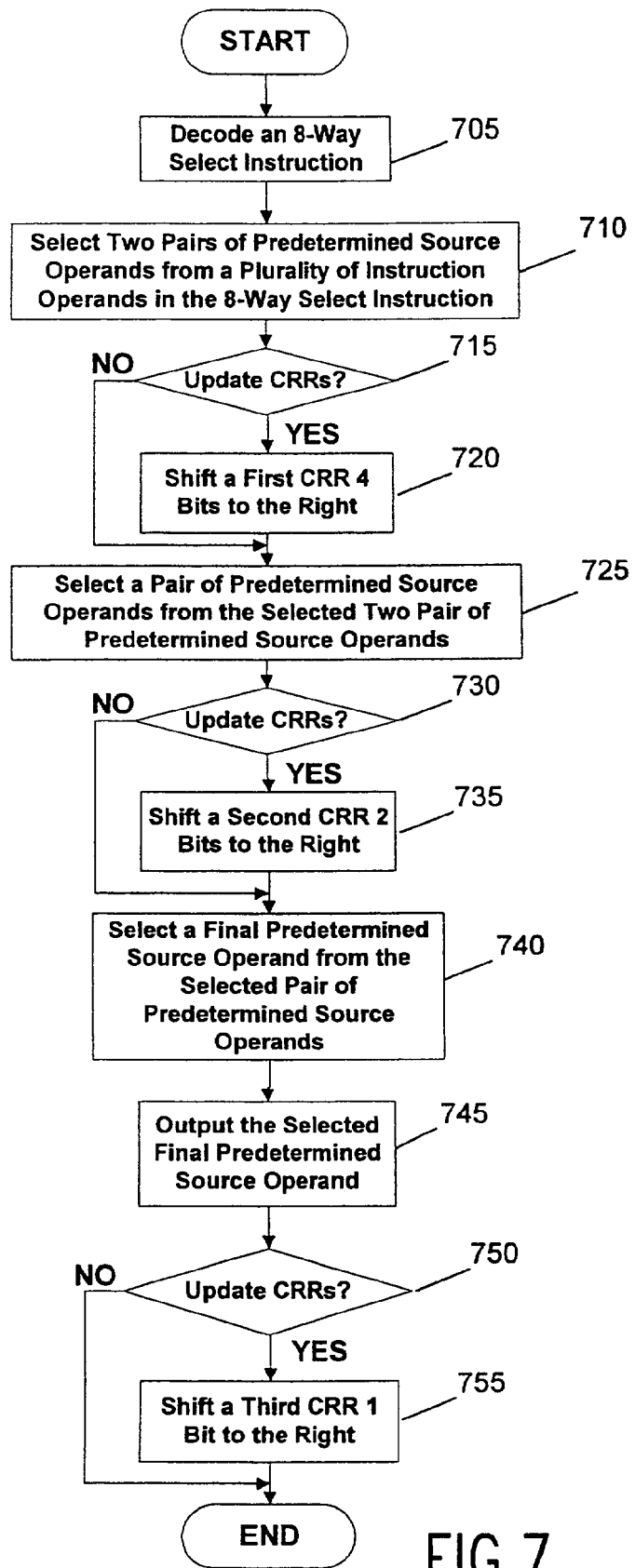
FIG. 7 is a detailed flow diagram of a method for providing an eight-way (8-way) select instruction in a processor, in accordance with an embodiment of the present invention.

FIG. 7 is a detailed flow diagram of a method for providing an 8-way select instruction in a processor, in accordance with an embodiment of the present invention. In FIG. 7, an instruction may be decoded 705 in a decoder in processor 110 of FIG. 1 as an 8-way select instruction. A pair of predetermined source operands may be selected 710 from a plurality of instruction operands in the 8-way select instruction. Each of the plurality of instructions may have a plurality of source operands. The need to update a CRR register may be determined 715, and if the CRR needs to be updated, the bits of a first CRR, for example, CRR0 230 of FIG. 2B, may be shifted 720 four (4) bits to the right.

In FIG. 7, regardless of whether the first CRR was updated, a pair of predetermined source operands may be selected 725 from the selected two pairs of predetermined source operands. Whether the CRRs are to be updated may again be determined 730. If the CRRs are to be updated 730, then a second CRR, for example, CRR1 235 of FIG. 2B, may be shifted 735 two (2) bits to the right.

In FIG. 7, regardless of whether the first and/or second CRR was updated, a final source operand may be selected 740 from the selected pair of predetermined source operands. The selected final predetermined source operand may be output 745 and whether the CRRs are to be updated may once again be determined 750. If the CRRs are to be updated 750, then a third CRR, for example, CRR2 (not shown) of FIG. 2A, may be shifted 755 one (1) bit to the right. The 8-way select instruction may terminate.

In accordance with other embodiments of the present invention, dual 8-way select, quad 8-way select, as well as equivalent 16-way and/or 32-or more-way select instructions may be implemented to select one or more predetermined source operands from two or more instruction operands. For example, the generic syntax of a dual 8-way select instruction may be represented by:

[CRR]destR=DSEL8(srcA, srcB, srcC, srcD)

where square brackets ([ ]) denote optional instruction parameters; and CRR may be a variable that controls the accumulation of condition codes. Similarly, the generic syntax of a quad 8-way select instruction may be represented by:

[CRR]destR=QSEL8(srcA, srcB, srcC, srcD)

where square brackets ([ ]) denote optional instruction parameters; and CRR may be a variable that controls the accumulation of condition codes.

In accordance with an embodiment of the present invention, the dual 8-way select and the quad 8-way select instructions generally, may be completely executed over two (2) processor clock cycles. However, the dual 8-way select and the quad 8-way select instructions also may be implemented over a single clock cycle as well as over three (3) or more clock cycles.

In accordance with an embodiment of the present invention, a method for providing a multi-way select instruction in a processor includes decoding an instruction as a multi-way select instruction. The method also includes selecting at least one pair of source operands from a plurality of instruction operands using information from a plurality of parallel control registers and selecting a final source operand from each of the selected at least one pair of source operands. The method further includes outputting the selected final source operand.

In accordance with an embodiment of the present invention, a processor includes a decoder to decode an instruction as a multi-way select instruction; and a circuit coupled to the decoder. The circuit, in response to the decoded instruction to select at least two source operands from a plurality of instruction operands using information from a plurality of parallel control registers, select a final source operand from each of the selected at least two source operands, and output each of the selected final source operands.

In accordance with an embodiment of the present invention, a computer system is provided including a processor and a machine-readable medium coupled to the processor in which is stored one or more instructions adapted to be executed by the processor. The instructions, when executed, configure the processor to decode an instruction as a multi-way select instruction, select at least two of source operands from a plurality of instruction operands using information from a plurality of parallel control registers, select a final source operand from each of the selected at least two source operands, and output each of the selected final source operands.

In accordance with an embodiment of the present invention, a machine-readable medium is provided in which is stored one or more instructions adapted to be executed by a processor. The instructions, when executed, configure the processor to decode an instruction as a multi-way select instruction, select at least two pairs of source operands from a plurality of instruction operands using information from a plurality of parallel control registers, select a final source operand from each of the selected at least two source operands, and output each of the selected final source operands.

While the embodiments described above relate mainly to 32-bit data path and 32 bit register-based 4-way select and 8-way select instruction embodiments, they are not intended to limit the scope or coverage of the present invention. In fact, the method and apparatus described above may be implemented with different sized data types and processing cores such as, but not limited to, for example, 8-bit, 16-bit, 32-bit and/or 64-bit data, as well as, 16-way and/or 32-way select instructions. In addition, in other embodiments, the specific bit locations identified with each source operand may be varied as required to work with different types of data, for example, packed data.

It should, of course, be understood that while the present invention has been described mainly in terms of microprocessor-based and multiple microprocessor-based personal computer systems, those skilled in the art will recognize that the principles of the invention, as discussed herein, may be used advantageously with alternative embodiments involving other integrated processor chips and computer systems. Accordingly, all such implementations, which fall within the spirit and scope of the appended claims, will be embraced by the principles of the present invention.

What is claimed is:

1. A method for providing a multi-way select instruction in a processor, the method comprising:

decoding an instruction as a multi-way select instruction comprising a plurality greater than two of instruction operands;
selecting at least one pair of source operands from the plurality of instruction operands using information from a plurality of parallel control registers;
selecting a final source operand from each of said selected at least one pair of source operands; and
outputting each of said selected final source operands.

2. The method as defined in claim 1 wherein said decoding operation comprises:
decoding a four-way select instruction, said four-way select instruction having said plurality of instruction operands.

3. The method as defined in claim 2 wherein said selecting at least one pair of source operands operation comprises:
selecting a predetermined source operand from each of said plurality of instruction operands.

4. The method as defined in claim 3 wherein said selecting said predetermined source operand operation comprises:
selecting a first predetermined source operand from a first of said plurality of instruction operands; and
selecting a second predetermined source operand from a second of said plurality of instruction operands.

5. The method as defined in claim 4 wherein said first instruction operand includes a first source operand having a plurality of low bits from said first instruction operand and a second source operand having a plurality of high bits from said first instruction operand, said second instruction operand includes a third source operand having a plurality of low bits from said second instruction operand and a fourth source operand having a plurality of high bits from said second instruction operands.

6. The method as defined in claim 5 wherein said selecting said first predetermined source operand operation comprises:
selecting said first predetermined source operand based on a predetermined relationship between said first source operand and said second source operand.

7. The method as defined in claim 6 wherein said predetermined relationship is defined by a preset bit value in a control register.

8. The method as defined in claim 7 wherein said preset bit value is set by a prior instruction execution.

9. The method as defined in claim 5 wherein said selecting said second predetermined source operand operation comprises:
selecting said second predetermined source operand based on a predetermined relationship between said third source operand and said fourth source operand.

10. The method as defined in claim 9 wherein said predetermined relationship is defined by a preset bit value in a control register.

11. The method as defined in claim 10 wherein said preset bit value is set by a prior instruction execution.

12. The method as defined in claim 4 wherein said storing each of said selected, predetermined source operands operation comprises:
storing said first predetermined source operand; and
storing said second predetermined source operand.

13. The method as defined in claim 2 further comprising:
shifting a control register by two bits to the right, if requested by said four-way select instruction.

14. The method as defined in claim 2 wherein said selecting said final source operand operation comprises:
selecting said final source operand based on a predetermined relationship between a first predetermined source operand and a second predetermined source operand from said at least two source operands.

15. The method as defined in claim 2 wherein said outputting operation comprises:
storing said selected final source operand in a plurality of low bits in a destination register.

16. The method as defined in claim 15 wherein said predetermined relationship is defined by a preset bit value in a control register.

17. The method as defined in claim 16 wherein said preset bit value is set by a prior instruction execution.

18. The method as defined in claim 2 further comprising:
shifting a control register by one bit to the right, if requested by said four-way select instruction.

19. The method as defined in claim 2 wherein said selecting at least two source operands operation is controlled by a plurality of preset bit values stored in a first control register, said storing at least one source operand operation is controlled by a preset bit value stored in a second control register, and said first and second control registers are arranged in parallel.

20. The method as defined in claim 1 wherein said selecting at least two source operands operation occurs during a first cycle, and said selecting said one source operand and said storing each of said selected final source operands operations occur during a second cycle.

21. The method as defined in claim 1 wherein said decoding operation comprises:
decoding a four-way SIMD parallel select instruction, said four-way SIMD parallel select instruction having said plurality of instruction operands.

22. The method as defined in claim 21 wherein said selecting at least one pair of source operands operation comprises:
selecting a plurality of predetermined source operands from said plurality of instruction operands.

23. The method as defined in claim 22 wherein said selecting said plurality of predetermined source operands operation comprises:
selecting a first predetermined source operand from one of a low-bit source operand from a first of said plurality of instruction operands and a low-bit source operand from a second of said plurality of instruction operands;
selecting a second predetermined source operand from one of a high-bit source operand from said first of said plurality of instruction operands and a high-bit source operand from said second of said plurality of instruction operands;
selecting a third predetermined source operand from one of a low-bit source operand from a third of said plurality of instruction operands and a low-bit source operand from a fourth of said plurality of instruction operands; and
selecting a fourth predetermined source operand from one of a high-bit source operand from said third of said plurality of instruction operands and a high-bit source operand from said fourth of said plurality of instruction operands.

24. The method as defined in claim 23 wherein said selecting operation comprises:
selecting a first final source operand based on a predetermined relationship between a first predetermined source operand from said at least one pair of source operands and a third predetermined source operand from said at least one pair of source operands; and
selecting a second final source operand based on a predetermined relationship between a second predetermined source operand from said at least one pair of source operands and a fourth predetermined source operand from said at least one pair of source operands.

25. The method as defined in claim 21 further comprising shifting a control register by four bits to the right, if requested by said four-way SIMD parallel select instruction having a plurality of operands.

26. The method as defined in claim 21 wherein said outputting operation comprises:
storing a first of said selected final source operands in a plurality of low bits in a destination register; and
storing a second of said selected final source operands in a plurality of high bits in said destination register.

27. The method as defined in claim 21 further comprising:
shifting a control register by two bits to the right, if requested by said four-way SIMD parallel select instruction.

28. The method as defined in claim 1 wherein said decoding operation comprises:
decoding a quad 4-way select instruction, said quad 4-way select instruction having said plurality of instruction operands.

29. The method as defined in claim 28 wherein said selecting at least one pair of source operands operation comprises:
selecting two pairs of predetermined source operands from said plurality of instruction operands.

30. The method as defined in claim 29 wherein said selecting said plurality of predetermined source operands operation comprises:
selecting a first predetermined source operand from one of a low, low-bit source operand from a first of said plurality of instruction operands and a low, low-bit source operand from a second of said plurality of instruction operands;
selecting a second predetermined source operand from one of a low, high-bit source operand from said first of said plurality of instruction operands and a low, high-bit source operand from said second of said plurality of instruction operands;
selecting a third predetermined source operand from one of a high, low-bit source operand from said first of said plurality of instruction operands and a high, low-bit source operand from said second of said plurality of instruction operands;
selecting a fourth predetermined source operand from one of a high, high-bit source operand from said first of said plurality of instruction operands and a high, high-bit source operand from said second of said plurality of instruction operands;
selecting a fifth predetermined source operand from one of a low, low-bit source operand from a third of said plurality of instruction operands and a low, low-bit source operand from a fourth of said plurality of instruction operands;
selecting a sixth predetermined source operand from one of a low, high-bit source operand from said third of said plurality of instruction operands and a low, high-bit source operand from said fourth of said plurality of instruction operands;
selecting a seventh predetermined source operand from one of a high, low-bit source operand from said third of said plurality of instruction operands and a high, low-bit source operand from said fourth of said plurality of instruction operands; and
selecting an eighth predetermined source operand from one of a high, high-bit source operand from said third of said plurality of instruction operands and a high, high-bit source operand from said fourth of said plurality of instruction operands.

31. The method as defined in claim 30 wherein said selecting operation comprises:
selecting a first final source operand based on a predetermined relationship between a first predetermined source operand from said at least one pair of source operands and a fifth predetermined source operand from said at least one pair of source operands;
selecting a second final source operand based on a predetermined relationship between a second predetermined source operand from said at least one pair of source operands and a sixth predetermined source operand from said at least one pair of source operands;
selecting a third final source operand based on a predetermined relationship between a third predetermined source operand from said at least one pair of source operands and a seventh predetermined source operand from said at least one pair of source operands; and
selecting a fourth final source operand based on a predetermined relationship between a fourth predetermined source operand from said at least one pair of source operands and an eighth predetermined source operand from said at least one pair of source operands.

32. The method as defined in claim 28 further comprising shifting a control register by four bits to the right, if requested by said quad select instruction having a plurality of operands.

33. The method as defined in claim 28 wherein said outputting operation comprises:
storing a first of said selected final source operands in a plurality of low, low bits in a destination register;
storing a second of said selected final source operands in a plurality of low, high bits in said destination register;
storing a third of said selected final source operands in a plurality of high, low-bits in said destination register; and
storing a fourth of said selected final source operands in a plurality of high, high-bits in said destination register.

34. The method as defined in claim 28 further comprising:
shifting a control register by four bits to the right, if requested by said quad select instruction.

35. The method as defined in claim 1 wherein said decoding operation comprises one of:
decoding an N-way select instruction, said N-way select instruction having said plurality of instruction operands;
decoding a dual N-way select instruction, said dual N-way select instruction having said plurality of instruction operands; and
decoding a quad N-way select instruction, said quad N-way select instruction having said plurality of instruction operands.

36. A processor, said processor comprising:
a decoder to decode an instruction as a multi-way select instruction comprising a plurality greater than two of instruction operands; and
a circuit coupled to said decoder, said circuit in response to said decoded instruction to,
select at least two source operands from the plurality of instruction operands using information from a plurality of parallel control registers;
select a final source operand from each of said selected at least two source operands; and
output each of said selected final source operands.

37. The processor defined in claim 36 wherein said decoder to decode said instruction as one of:
- an N-way select instruction, said N-way select instruction having said plurality of instruction operands;
- a dual N-way select instruction, said dual N-way select instruction having said plurality of instruction operands; and
- a quad N-way select instruction, said quad N-way select instruction having said plurality of instruction operands.

38. A computer system, said computer system comprising:
- a processor; and
- a machine-readable medium coupled to the processor in which is stored one or more instructions adapted to be executed by the processor, the instructions which, when executed, configure the processor to
  - decode an instruction as a multi-way select instruction comprising a plurality greater than two of instruction operands;
  - select at least two source operands from the plurality of instruction operands using information from a plurality of parallel control registers;
  - select a final source operand from each of said selected at least two source operands; and
  - output each of said selected final source operands.

39. The computer system as defined in claim 38 wherein said decode operation comprises one of:
- decode said instruction as an N-way select instruction, said N-way select instruction having said plurality of instruction operands;
- decode said instruction as a dual N-way select instruction, said dual N-way select instruction having said plurality of instruction operands; and
- decode said instruction as a quad N-way select instruction, said quad N-way select instruction having said plurality of instruction operands.

40. A machine-readable medium, said machine-readable medium having stored thereon one or more instructions adapted to be executed by a processor, the instructions which, when executed, configure the processor to:
- decode an instruction as a multi-way select instruction comprising a plurality greater than two of instruction operands;
- select at least two source operands from the plurality of instruction operands using information from a plurality of parallel control registers;
- select a final source operand from each of said selected at least two source operands; and
- output each of said selected final source operands.

41. The machine-readable medium as defined in claim 40 wherein said decode operation comprises one of:
- decode said instruction as an N-way select instruction, said N-way select instruction having said plurality of instruction operands;
- decode said instruction as a dual N-way select instruction, said dual N-way select instruction having said plurality of instruction operands; and
- decode said instruction as a quad N-way select instruction, said quad N-way select instruction having said plurality of instruction operands.

* * * * *